(12) United States Patent
Ogawa et al.

(10) Patent No.: US 7,467,773 B2
(45) Date of Patent: Dec. 23, 2008

(54) SUPPORT STRUCTURE FOR LIQUID CRYSTAL TELEVISION RECEIVER AND SUPPORT STRUCTURE FOR DISPLAY DEVICE

(75) Inventors: Masuo Ogawa, Osaka (JP); Katsuhiko Makino, Osaka (JP)

(73) Assignee: Funai Electric Co., Ltd., Daito-Shi, Osaka (JP)

( * ) Notice: Subject to any disclaimer, the term of this patent is extended or adjusted under 35 U.S.C. 154(b) by 543 days.

(21) Appl. No.: 11/302,949

(22) Filed: Dec. 14, 2005

(65) Prior Publication Data

US 2006/0221264 A1    Oct. 5, 2006

(30) Foreign Application Priority Data

Dec. 14, 2004   (JP)   ............ P2004-360933

(51) Int. Cl.
A47F 1/14   (2006.01)
A47G 1/16   (2006.01)
B60R 1/02   (2006.01)

(52) U.S. Cl. .......... 248/472; 248/917; 248/919; 248/474; 248/454; 248/456; 40/745; 40/748; 40/756; 361/681; 361/682

(58) Field of Classification Search ........ 248/917, 248/919–923, 472, 474, 454–456, 688, 673, 248/677; 40/745, 748, 756; 361/681–682
See application file for complete search history.

(56) References Cited

U.S. PATENT DOCUMENTS

| | | | | |
|---|---|---|---|---|
| 422,673 | A | * | 3/1890 | Werner .......... 248/455 |
| 3,408,033 | A | * | 10/1968 | Kochevar et al. ......... 248/474 |
| 3,908,955 | A | * | 9/1975 | Frechtman ........ 248/470 |
| 6,651,943 | B2 * | | 11/2003 | Cho et al. ........ 248/122.1 |
| 6,751,899 | B2 * | | 6/2004 | Cress et al. ........ 40/748 |

(Continued)

FOREIGN PATENT DOCUMENTS

JP    61-156360    9/1986

(Continued)

OTHER PUBLICATIONS

Patent Abstracts of Japan, Publication No. 11-097865, Publication Date Apr. 9, 1999, 1 page.

*Primary Examiner*—J. Allen Shriver, II
*Assistant Examiner*—Michael McDuffie
(74) *Attorney, Agent, or Firm*—Osha • Liang LLP

(57) ABSTRACT

A support structure for a display device includes a base member fixed to a rear surface of the display device, a support member which is fixed pivotably to the base member and supports the display device in a supporting position in an opened state where the display device is inclined at a predetermined angle and capable of being stored in a closed state, a holding member fixed to the base member including a regulation portion that regulates rotation of the support member beyond the supporting position, a pressure member that presses an end portion of the support member, and a compression coiled spring that urges the pressure member toward the support member. The pressure member includes a protruded portion having a triangular cross section, and inclined surfaces contacting with the support member while pressing the end portion when the support member rotates from the closed state to the opened state.

5 Claims, 11 Drawing Sheets

U.S. PATENT DOCUMENTS

| | | | | |
|---|---|---|---|---|
| 6,899,311 | B1 * | 5/2005 | Ternus | 248/454 |
| 6,971,622 | B2 * | 12/2005 | Ziegler et al. | 248/454 |
| 7,021,600 | B2 * | 4/2006 | Yang | 248/688 |
| 7,239,506 | B2 * | 7/2007 | Ogawa et al. | 361/681 |
| 7,320,451 | B2 * | 1/2008 | Ogawa | 248/161 |
| 2006/0049327 | A1 * | 3/2006 | Chen | 248/371 |
| 2006/0237623 | A1 * | 10/2006 | Sung | 248/688 |
| 2007/0018061 | A1 * | 1/2007 | Ogawa et al. | 248/166 |
| 2007/0235626 | A1 * | 10/2007 | Mamizuka et al. | 248/677 |

FOREIGN PATENT DOCUMENTS

| | | |
|---|---|---|
| JP | 7-37817 | 7/1995 |
| JP | 11-97865 | 4/1999 |

* cited by examiner

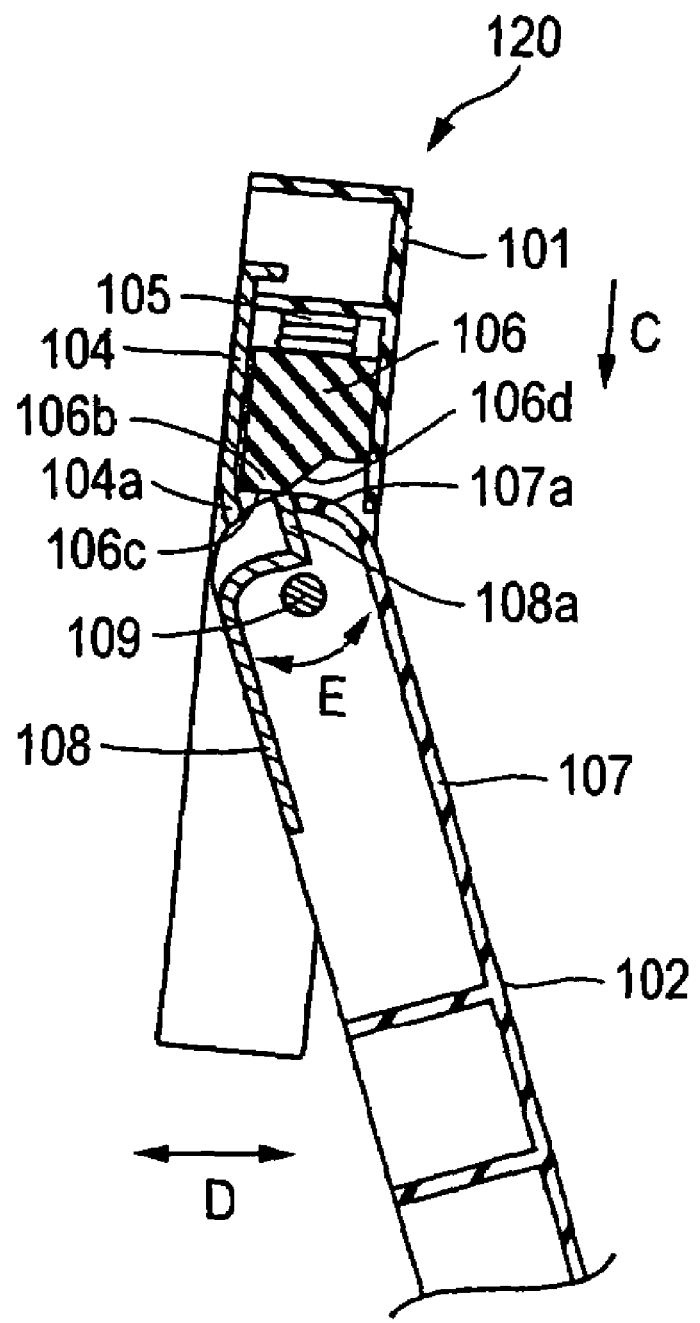

_US 7,467,773 B2_

SUPPORT STRUCTURE FOR LIQUID CRYSTAL TELEVISION RECEIVER AND SUPPORT STRUCTURE FOR DISPLAY DEVICE

BACKGROUND OF THE INVENTION

1. Field of the Invention

This invention relates to a support structure for liquid crystal television receiver and a support structure for display device, and a support structure for crystal liquid television and a support structure for display device, which are provided with a pressure member pressed against a support member.

2. Description of the Related Art

Various structures for pivotably supporting liquid crystal television receiver and the like have heretofore been proposed (for example, JP-UM-A-7-37817, JP-UM-B-61-156360, and JP-A-11-97865).

JP-UM-A-7-37817 mentioned above discloses a bias structure for a display device, adapted to turn a display device with respect to a chassis, in which plural recesses provided at equal intervals in a click and the like fixed to a lower end portion of the display device are engaged with projections of a lever made of a leaf spring fixed to the chassis, the display device being thereby supported in a predetermined angular position with the angle of the display device rendered possible to be varied in a stepped manner.

The JP-UM-B-61-156360 mentioned above discloses an angle regulating apparatus adapted to regulate an angle of a monitor television (of a display device) by turning to a predetermined position a leg member fixed pivotably to a shaft formed on a support member fixed to a case, in which engagement projections of a leaf spring fixed to a support member are engaged with plural engagement recesses provided at predetermined intervals in a leg member, the monitor television being thereby supported in a position of a predetermined angle with the angle of the monitor television capable of being varied in a stepped manner.

JP-A-11-97865 mentioned above discloses a fixing structure for an electronic machine (display device), in which a rotary shaft rotatably supporting a display device is supported on a bearing portion provided on a support structure, U-shaped or V-shaped both end portions provided at both ends of a cover made of metal plate having an elasticity fixed to the rotary shaft are engaged with U-shaped or V-shaped groove provided continuously in an outer circumferential section of the bearing portion, by which the display device is supported in a predetermined angular position with the angle of the display device being possible to be varied in a stepped manner.

A support structure for liquid crystal television receiver has heretofore been known. FIG. 14 is a front view showing the condition of an example of a related art support structure for liquid crystal television receiver, fixed to a rear surface of liquid crystal television receiver. FIG. 15 to FIG. 17 are drawings for describing detailed construction of a related art support structure for liquid crystal television receiver shown in FIG. 14. The construction of a related art support structure 120 for liquid crystal television receiver will be described with reference to FIG. 14 to FIG. 17.

A related art example of the support structure 120 for liquid crystal television receiver has as shown in FIG. 14 a base member 101 fixed with screws to a rear surface 151 of the liquid crystal television receiver 150, a support member 102 fixed pivotably to the base member 101, and a floor surface contacting members 103 made of rubber and fixed to a lower portion of the support member 102.

As shown in FIG. 17, a metal holding member 104 is fixed to the base member 101. This holding member 104 is provided with an inhibition portion 104a for inhibiting the turning of the support member to a position beyond a supporting position. In an inner portion of the base member 101, a slider 106 to which a compression coiled spring 105 is fixed is provided. This compression coiled spring 105 has a function of urging the slider 106 toward the support member 102. The slider 106 is provided with spring fitting holes 106a, and a projection 106b extending toward the support member 102 as shown FIG. 16. These spring fitting holes 106a are formed so that the spring fitting holes 106 have a depth D1 (about 9.4 mm). The projection 106b has a flat surface and an inclined surface 106d.

As shown in FIG. 15 and FIG. 17, the support member 102 has a main support 107 made of a synthetic resin, and a metal cover member 108 fixed to the main support 107. This support member 102 is fixed so that the support member 102 can be turned around a rotary shaft 109 supported on the base member 101 as shown in FIG. 17. As shown in FIG. 15 and FIG. 17, the main support 107 is formed on the side of the base member 101, and includes an end portion 107a having a curved surface, and a rotary shaft fixing hole 107b (refer to FIG. 15) for inserting the rotary shaft 109 thereinto. The cover member 108 has a projection 108a thereof fixed thereto so that the projection 108a extends from an end portion 107a of the main support 107 toward the slider 106 to a position upper than that of the end portion 107a.

FIG. 18 is a sectional view for describing the opening and closing actions of the support structure 120 for liquid crystal television receiver. Next, the opening and closing actions of the support structure 120 for the liquid crystal television receiver will be described with reference to FIG. 17 and FIG. 18. First, the support member 120 for the liquid crystal television receiver shown in FIG. 17 which is in a closed state with respect to a rear surface 151 (refer to FIG. 14) of the liquid crystal television receiver 150 is turned in the direction of an arrow A in FIG. 17. During this time, the projection 108a of the cover member 108 engages with the inclined surface 106d of the slider 106 and presses the same, so that the slider 106 is moved in the direction of an arrow B in FIG. 17 against an urging force of the compression coiled spring 105. When the support member 102 in this condition is further turned, the projection 108a engages with the flat surface 106c over the inclined surface 106d of the slider 106. As shown in FIG. 18, the support member 102 is turned until the projection 108a of the cover member 108 engages with the restriction portion 104a of the holding member 104 fixed to the base member 101. This enables the liquid crystal television receiver to be supported in an inclined state.

In the related art support structure 120 for liquid crystal television receiver shown in FIG. 14 to FIG. 18, the projection 108a of the cover member 108 of the support member 102 engages with the flat surface 106c in a pivotal angular position in which the projection 108a gets over the inclined surface 106d of the slider 106. Therefore, the support member 102 is pressed in the direction of an arrow C in FIG. 19 owing to the pressing force of the slider 106 in which the compression coiled spring 105 is buried. Accordingly, in a pivotal angular position in which the projection 108a of the cover member 108 of the support member 102 has already got over the inclined surface 106d of the slider 106, the turning of the support member 102 is inhibited even though the support structure is not in a completely opened state, so that the projection 108a of the cover member 108 of the support member 102 is kept on the flat surface 106c. Due to the structure, inconveniences occur in which the position of the support member 102 is held in a pivotal angular position in which the support member 102 has not attained a completely opened state. When an external horizontal (direction of D in FIG. 19) force the level of which is not lower than a predetermined level is imparted to the support member 102 in this condition, the position of the support member 102 does not become stable. The support member 102 is turned in some cases in the direction E in FIG. 19, so that it is difficult to support the liquid crystal television receiver 150 stably.

In the bias structure of the display device disclosed in JP-UM-A-7-37817, a mechanism for inhibiting the turning of the display device is not provided. Therefore, when the display device is further turned from the condition in which the display device is turned maximally with the projection of the lever engaged with the recess of the click, the display device is turned inconveniently. Since the lever pressing the click is made of a leaf spring, it is difficult to urge the projection of the lever, which is engaged with the recess of the click, with a force the level of which is not lower than a predetermined level. Therefore, when a force the level of which is not lower than a predetermined level is applied in the display device turning direction, the display device is liable to be turned, so that it is difficult to support the display device stably.

In the angle regulating mechanism, such as the monitor television (display device) disclosed in JP-UM-B-61-156360, the engagement projections of leaf springs are engaged with the engagement grooves of the leg member. Therefore, it is difficult to urge the projections of leaf springs toward the engagement grooves of the leg member with a force the level of which is not lower than a predetermined level. As a result, when a force the level of which is not lower than a predetermined level is imparted in the monitor television turning direction, the monitor television is liable to be turned. Since plural engagement grooves are provided at predetermined intervals in the leg member, the engagement projections of leaf springs are retained in positions among the engagement grooves. Due to the matter, the position of the monitor television is retained in a pivotal angle position in which the projections of leaf springs are not engaged with the engagement grooves of the leg member. When an external force is applied to the monitor television in this condition, the monitor television becomes liable to be turned in some cases, so that it is difficult to support the monitor television stably.

In the structure for fixing the electronic machine (display device) disclosed in JP-A-11-97865, the elastic metal cover is engaged at both end portions thereof with the groove formed in the outer circumferential portion of the bearing, so that it is difficult to urge both end portions of the metal cover toward the groove of the bearing with a force the level of which is not lower than a predetermined level. Therefore, when a force the level of which is not lower than a predetermined level is imparted in the display device turning direction, the display device is turned in some cases, so that it is difficult to support the display device stably.

SUMMARY OF THE INVENTION

The present invention provides a support structure for liquid crystal television receiver and a support structure for a display device which are capable of supporting the liquid crystal television receiver and display device stably even when a force the level of which is not lower than a predetermined level is imparted thereto.

According to an first aspect of the present invention, a support structure for liquid crystal television receiver includes a base member fixed to a rear surface of the liquid crystal television receiver, a support member which is fixed pivotably to the base member and supports the liquid crystal television receiver in a supporting position in an opened state in which the liquid crystal television receiver is inclined at a predetermined angle with respect to the base member and capable of being stored in the base member in a closed state in which the support member is closed with respect to the base member, a holding member which is fixed to the base member and includes a regulation portion that regulates rotation of the support member beyond the supporting position, a pressure member that presses an end portion of the support member, and a compression coiled spring which urges the pressure member toward the support member. The base member includes a boss portion. The pressure member includes a protruded portion having a cross section of an end-sharpened triangle, and first and second inclined surfaces which contact with the support member while pressing the end portion of the support member when the support member rotates from the closed state to the opened state, and a groove which is opposed to the boss portion of the base member. The support member includes a recess engaging the first inclined surface of the pressure member when the support member is in the opened state, and a metal reinforcement member which is fixed at the end portion pressed by the pressure member of the support member.

The support structure for liquid crystal television receiver according to this first aspect of the invention is provided as mentioned above with a cross-sectionally triangular projection including the first inclined surface and the second inclined surface, which are engaged with the support member as the inclined surfaces press the support member, on the pressure member. Therefore, when the support member is turned from a closed position toward an opened position, the support member engages with the first inclined surface of the pressure member. Before the support member gets over the first inclined surface, the support member is pressed by the first inclined surface of the pressure member, which is urged by the compression coiled spring toward the support member, the support member can be returned to the pivotal position in which the support member is closed, even though the support member is turned at a predetermined angle. When the support member is turned from a closed state to an opened state, the support member is pressed by the second inclined surface of the pressure member urged toward the support member by the compression coiled springs after the support member gets over the first inclined surface and reaches the same inclined surface. This enables the support member to be automatically placed, in a pivotal position (supporting position) in which the support member is in an opened state, owing to the pressing force of the second inclined surface. As a result, the liquid crystal television receiver can be supported stably in the supporting position. This can prevent the support member from being held in an intermediate pivotal position other than the pivotal position in which the support member is in a closed state or in an opened state. As a result, the liquid crystal television receiver can be supported stably in a supporting position.

Since the compression coiled springs having a large force urging the support member toward the pressure member are used in the first aspect of the invention, the support member can be pressed by such a level of force that is larger than that in the case where the pressing force of an elastic metal member is used. Even when a large force of not lower than a predetermined level by which the support member is turned in the support member closing direction is imparted thereon in the supporting position in which the support member is in an opened state, the turning of the support member in the opened state to the support member closing position can be suppressed more effectively than in a case where the support member is pressed by an elastic metal member, such as a leaf spring. Fixing to the base member the holding member including an inhibition portion for inhibiting the turning of the support member to a position beyond the supporting position enables the turning of the support member beyond the supporting position to be suppressed owing to the inhibition portion of the holding member even when the support member is nearly turned to a position beyond the supporting position. Since the recess engaged with the first inclined surface of the pressure member when the support member is in an opened state is provided on the support member, the first inclined surface of the pressure member urged in the supporting position by the compression coiled spring can be engaged with the recess of the support member, so that the support member can be retained in the opened condition (supporting position) more stably. The boss portions are formed in the base member, and a recess in some of the boss portions of the base member which are opposed to the boss portions of the base member are formed in the pressure member. When the pressure member and compression coiled springs which are adapted to urge the pressure member toward the support member are provided on the base member, the boss portions of the base member can thereby be engaged with the groove of the pressure member. Therefore, even when the compression coiled springs and pressure member are provided so that the springs and pressure member are bent and pressed toward the support member respectively, the pressure member can be set with the compression coiled springs left bent owing to the boss portions of the base member. This enables the pressure member and compression coiled springs to be combined easily with the base member. Since the end portion pressed by the pressure member of the support member is provided with the metal reinforcement member. Therefore, even when the portion of the support member which presses the pressure member is pushed by the pressure member with a force not lower than a predetermined level, the breakage of the support member can be suppressed by the metal reinforcement member.

According to a second aspect of the present invention, a support structure for a display device includes a base member fixed to a rear surface of the display device, a support member which is fixed pivotably to the base member and supports the display device in a supporting position in an opened state in which the display device is inclined at a predetermined angle with respect to the base member and capable of being stored in the base member in a closed state in which the support member is closed with respect to the base member, a holding member that is fixed to the base member and includes a regulation portion that regulates rotation of the support member beyond the supporting position, a pressure member that presses an end portion of the support member, and a compression coiled spring that urges the pressure member toward the support member. The pressure member includes a protruded portion having a cross section of an end-sharpened triangle, and first and second inclined surfaces which contact with the support member while pressing the end portion of the support member when the support member rotates from the closed state to the opened state.

In the second aspect of the present invention for a display device, the pressure member is provided as described above with a cross-sectionally triangular projection having a first inclined surface and a second inclined surface which engage with the support member while pressing the same. Owing to this structure, before the support member engages with and gets over the first inclined surface while the support member is turned from the closed state toward the opened state, the support member is pressed by the first inclined surface of the pressure member urged toward the support member by the compression coiled springs even though the support member is turned at a predetermined angle, so that the support member can be returned to the pivotal position in which the support member is in a closed state. When the support member is turned from the closed state toward an opened state, the support member is pressed by the second inclined surface of the pressure member urged toward the support member by the compression coiled sprins after the support member gets over the first inclined surface and reaches the second inclined surface, so that the support member can be automatically placed in the pivotal position (supporting position) in which the support member is in the opened state owing to the pressing force of the second inclined surface. Owing to this structure, the retaining of the support member in an intermediate position other than the position in which the support member is in a closed state or opened state can be restrained. As a result, the display device can be supported in a supporting position stably. Since the compression coiled spring of a large urging force urging the pressure member toward the support member is provided, the support member can be pressed with a force larger than that imparted to a support member using an elastic metal member, such as a leaf spring. Therefore, even when a force the level of which is not lower than a predetermined level, at which the support member is turned in the closing direction, is imparted to the support member in the supporting position in which the support member is in an opened state, the turning of the support member from the opened state can be restrained more effectively than in a case where the support member is pressed by an elastic metal member, such as a leaf spring. Since the holding member including a inhibition portion for inhibiting the turning of the support member to a position beyond the supporting position is fixed to the base member, the turning of the support member beyond the supporting position can be restrained by the inhibition portion of the holding member even when the support member is nearly turned to a position beyond the supporting position.

In the support structure for a display device according to the above-described second aspect of the present invention, the support member is preferably provided with a recess engaged with the first inclined surface of the pressure member when the support member is in an opened state. Since the support structure is thus formed, the first inclined surface of the pressure member urged toward the support member by the compression coiled springs can be engaged with the recess of the support member, the support member can be retained stably in the opened state (supporting position).

In the support structure for a display device according to the above-described second aspect of the invention, the base member preferably includes boss portions, and the pressure member is provided with a groove at the portion thereof which is opposed to the boss portions of the base member. When the support structure is thus formed, the boss portions of the base member and the groove of the pressure member can be engaged with each other when the pressure member and the compression coiled springs for urging the pressure member toward the support member are provided on the base member. Even when the compression coiled springs and pressure member are provided so that the coiled springs and pressure member are in a bent state and in a pressing state in which the pressure member is pressed thereby toward the support member respectively, the pressure member can be provided with the compression coiled springs left in a bent state owing to the boss portions of the base member. This enables the pressure member and compression coiled springs to be combined easily with the base member.

In the support structure for a display device according to the above-described second aspect of the invention, a metal reinforcement member is fixed on the end portion, which is pressed by the pressure member, of the support member. When the support structure is thus formed, the portion of the support member which pushes the pressure member inhibits the metal reinforcement member from breaking the support member even when the mentioned portion of the support member is pressed with a force the level of which is not lower than a predetermined level by the pressure member.

BRIEF DESCRIPTION OF THE DRAWINGS

FIG. 19 is a sectional view for describing points at issue of the related art example of the support structure for liquid crystal television receiver, shown in FIG. 14.

DETAILED DESCRIPTION OF THE INVENTION

The modes of embodiment in which the present invention is materialized will now be described on the basis of the drawings.

Figure 1:
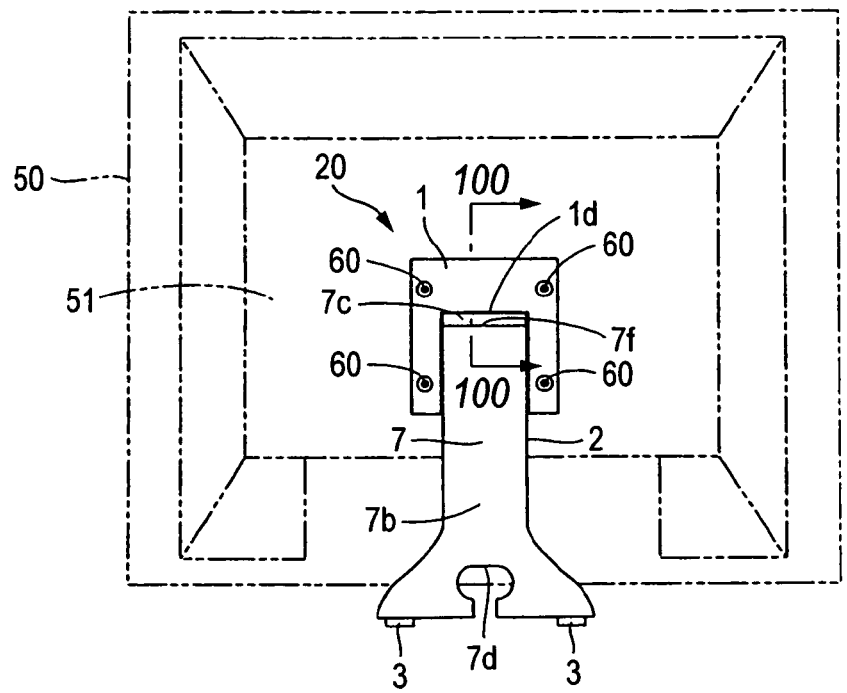
FIG. 1 is a front view showing the condition of the support structure for liquid crystal television receiver, fixed to the rear surface of liquid crystal television receiver in a mode of embodiment of the present invention

FIG. 1 is a front view showing a mode of embodiment of the support structure for liquid crystal television receiver, fixed to a rear surface of a liquid crystal television receiver. FIG. 2 to FIG. 10 are drawings for describing the detailed construction of the support structure for liquid crystal television receiver in a mode of embodiment of the present invention shown in FIG. 1. In this mode of embodiment, a case where the support structure for a display device is applied to a support structure 20 for liquid crystal television receiver will be described.

Figure 2:
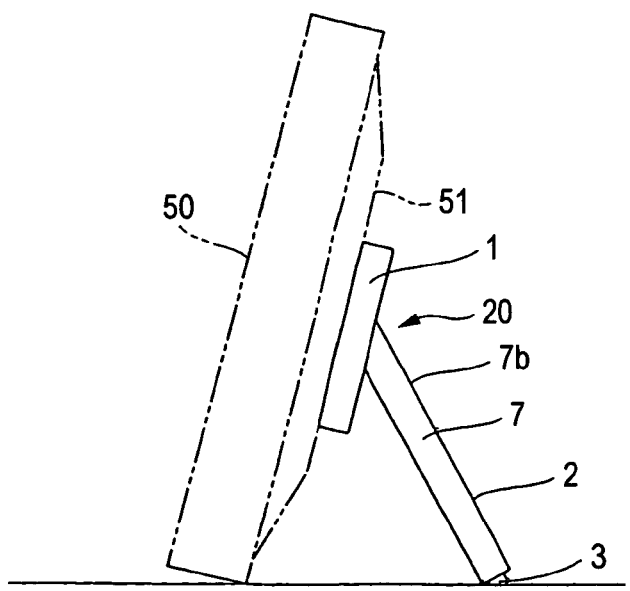
FIG. 2 is a side view showing the condition of the support structure for liquid crystal television receiver, fixed to the rear surface of liquid crystal television receiver in the mode of embodiment of the present invention shown in FIG. 1.

The support structure 20 for liquid crystal television receiver in one mode of embodiment of the present invention has as shown in FIG. 1 and FIG. 2 a base member 1 made of a resin fixed to a rear surface 51 of liquid crystal television receiver 50 with screws 60 (refer to FIG. 1), a support member 2 fixed pivotably to the base member 1, and floor surface contacting members 3 made of rubber fixed to a lower portion of the support member 2. The support member 2 retains in an opened state the liquid crystal television receiver 20 supported in a supporting position, or in a closed state in which the support member 2 is in a closed state on the side of the rear surface 51 of the liquid crystal television receiver 50.

Figure 3:
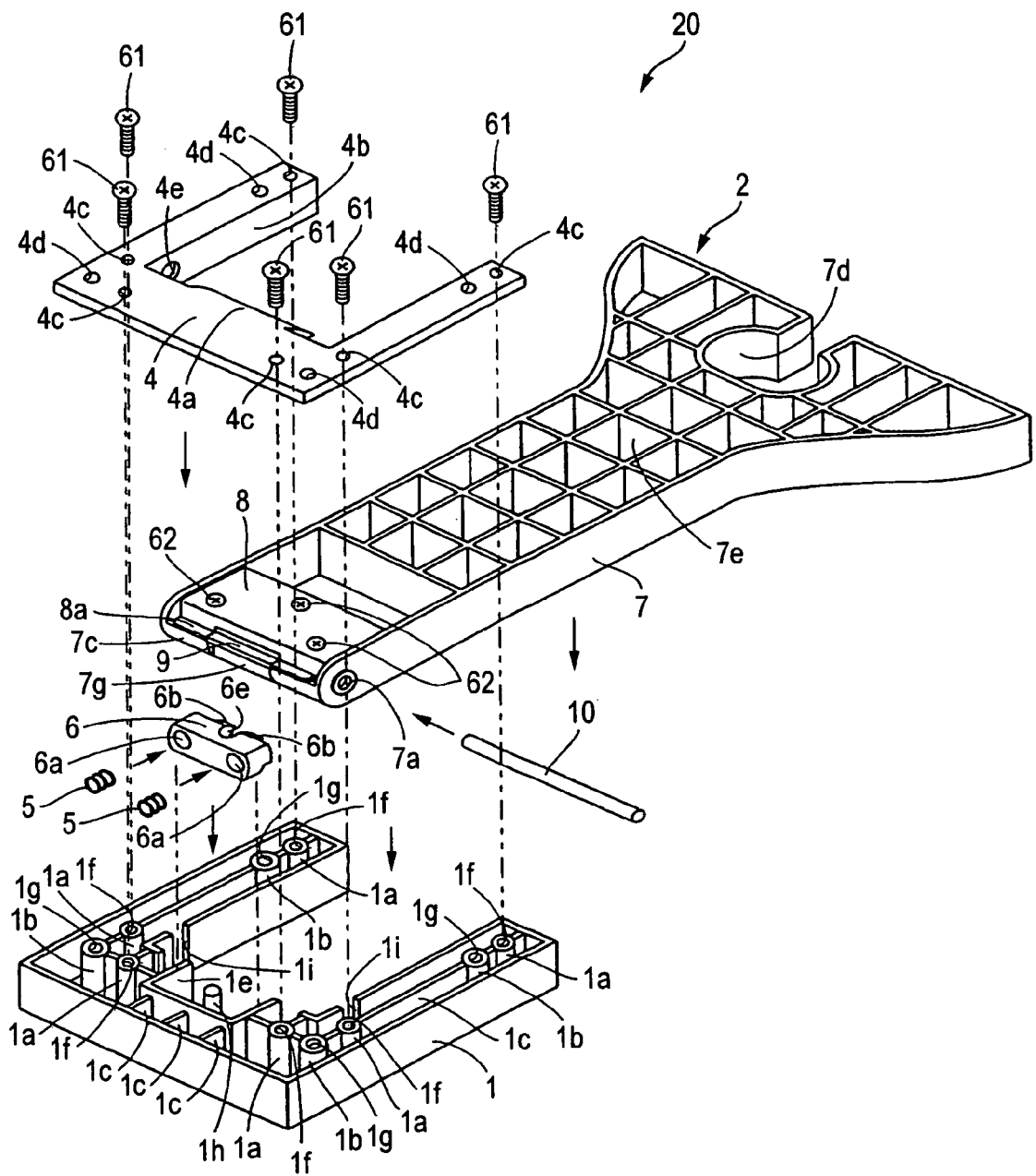
FIG. 3 is an exploded view in perspective of the support structure for liquid crystal television receiver in the mode of embodiment of the present invention shown in FIG. 1.

The base member 1 has as shown in FIG. 3 six boss portions 1a, four boss portions 1b, reinforcement ribs 1c for reinforcing a hollow of the inner portion of the base member 1, and a slider storage portion 1e. The six boss portions 1a are provided with screw holes 1f respectively. The four boss portions 1b are provided with screw inserting holes 1g respectively in which the screws 60 (refer to FIG. 1) are inserted. In the inner section of the slider storage portion 1e, a boss portion 1h is formed.

Figure 5:
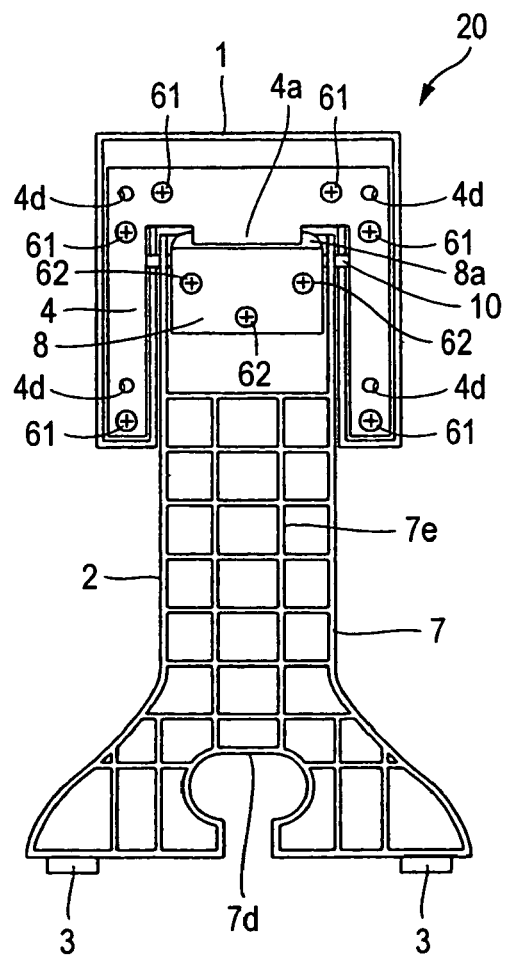
FIG. 5 is a rear view of the support structure for liquid crystal television receiver in the mode of embodiment of present invention shown in FIG. 1.
Figure 9:
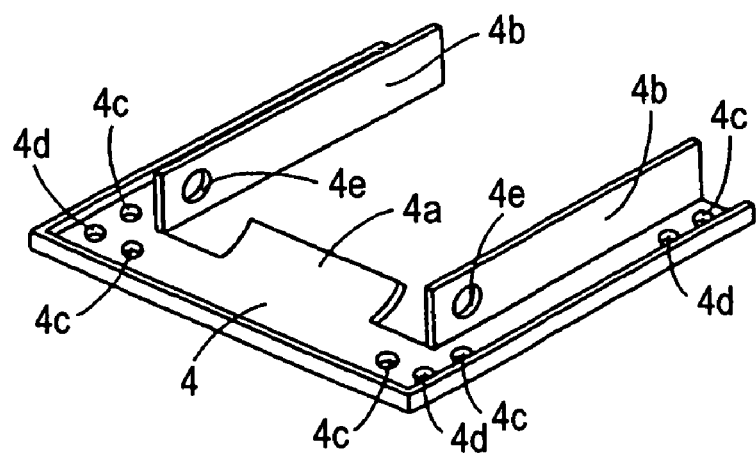
FIG. 9 is a perspective view of the holding member of the support structure for liquid crystal television receiver in the mode of embodiment of the present invention shown in FIG. 1.

On the base member 1, a holding member 4 made of a metal is fixed as shown FIG. 5 by tightening six screws 61 into the screw holes 1f (refer to FIG. 3) provided in the six boss portions 1a (refer to FIG. 3) of the base member 1. This holding member 4 is provided as shown in FIG. 3 and FIG. 9 with an inhibition portion 4a for inhibiting the turning of the support member 2 beyond the supporting position, and a pair of side walls 4b bent toward the base member 1. The holding member 4 is provided in the portions thereof which correspond to the screw holes 1f made in the six boss portions 1a of the base member 1 with screw inserting holes 4c, and in the portions thereof which correspond to the screw inserting holes 1g made in the four boss portions 1b of the base member 1 with screw inserting holes 4d. The support structure 20 for liquid crystal television receiver is fixed to the rear surface 51 (refer to FIG. 1) of the liquid crystal television receiver by tightening the screws 60 (refer to FIG. 1) via the screw inserting holes 1g made in the four boss portions 1b and the screw inserting holes 4d made in the holding member 4. The two side walls 4b are provided with rotary shaft inserting holes 4e through which a rotary shaft 10 which will be described later is inserted.

Figure 4:
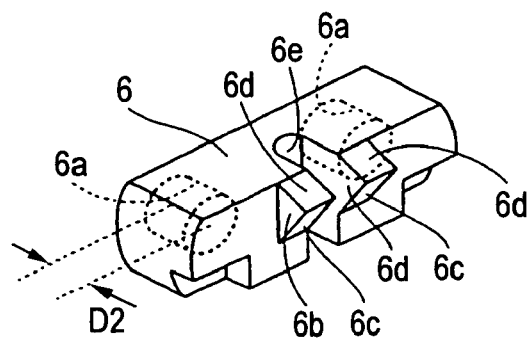
FIG. 4 is a rear view of the slider for the support structure for liquid crystal television receiver in the mode of embodiment of the present invention shown in FIG. 1.
Figure 16:
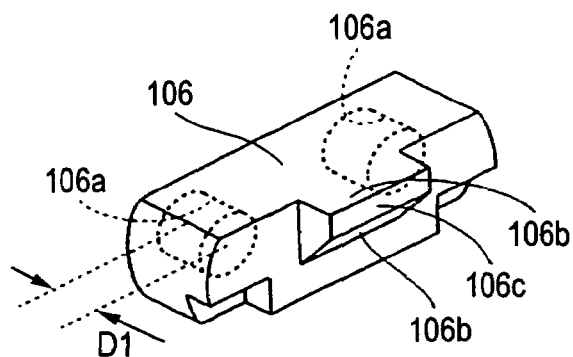
FIG. 16 is a perspective view showing a slider for the related art support structure for liquid crystal television receiver shown in FIG. 14.
Figure 17:
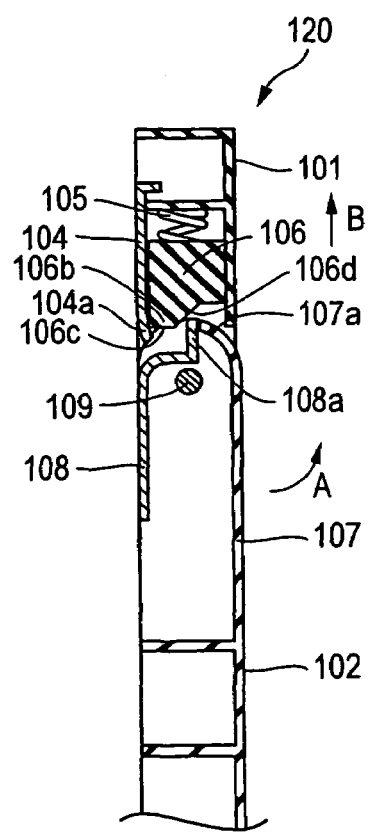
FIG. 17 is a sectional view taken along the line 300-300 in FIG. 14.
Figure 18:
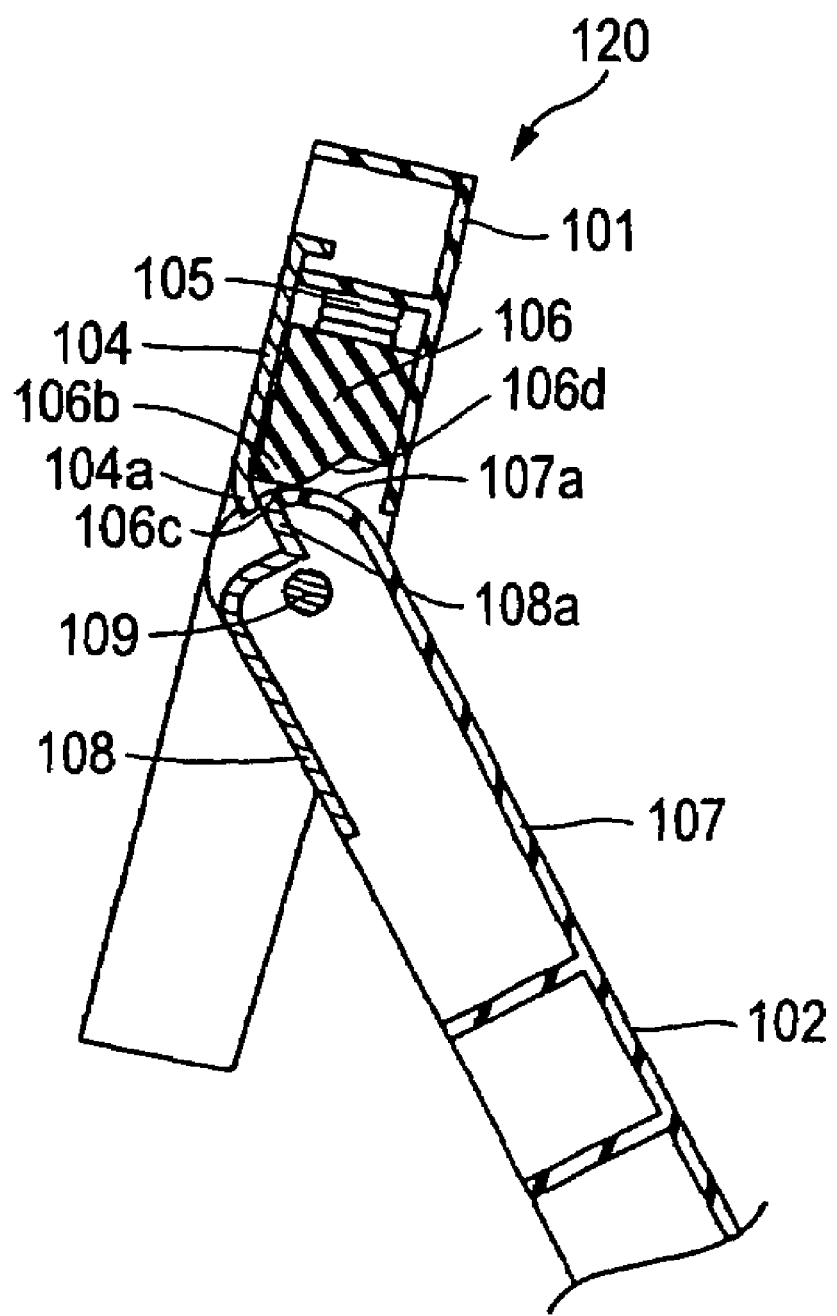
FIG. 18 is a sectional view for describing the opening and closing actions of the example of the related art support structure for liquid crystal television receiver, shown in FIG. 14.

A slider in which two compression springs 5 are fitted is provided as shown in FIG. 3 in the slider storage portion 1e of the base member 1. The slider 6 is an example of the "pressure member" in the present invention. These two compression coiled springs 5 are fitted in two spring fitting holes 6a provided in the slider 6. The two spring fitting holes 6a are formed as shown in FIG. 4 so that these holes have a depth of D2 (about 6.4 mm). The depth D2 of the spring fitting holes 6a is set smaller than that D1 (about 9.4 mm, refer to FIG. 16) of the spring fitting holes 106a made in the slider 106 provided in the related art support structure 120 for liquid crystal television receiver. Owing to such a structure, the compression coiled springs 5 can be bent more than that 105 used in the related art support structure even when the compression coiled springs 5 identical with those 105 in the related art support structure are used. This enables the slider 6 in which the compression springs 5 are provided to be pressed toward the support member 2 with a larger force.

In this mode of embodiment, the slider 6 is provided with end-sharpened cross-sectionally triangular projection 6b including inclined surfaces 6c, 6d which are pressed by the support member 2 when the support member 1 is turned. The inclined surfaces 6c are examples of the "first inclined surfaces" in the present invention, and the inclined surfaces 6d examples of the "second inclined surfaces" in the present invention.

In this mode of embodiment, the slider 6 is provided with a groove 6e at the portion thereof which is opposed to the boss portion 1h (refer to FIG. 3) provided in the slider storage portion 1e of the base member 1. Owing to this structure, when the slider 6 and compression coiled springs for urging the slider 6 toward the support member 2 are provided on the base member 1, the boss portion 1h of the base member 1 can be engaged with the groove 6e of the slider 6. As a result, even when the compression springs 5 and slider 6 are provided so that the coiled spring 5 and slider 6 are bent and urged toward the support member respectively, the slider 6 can be provided with the compression coiled springs 5 left bent owing to the boss portion 1h of the base member 1. Therefore, it becomes easy to combine the slider 6 and compression coiled springs 5 with the base member 1.

Figure 6:
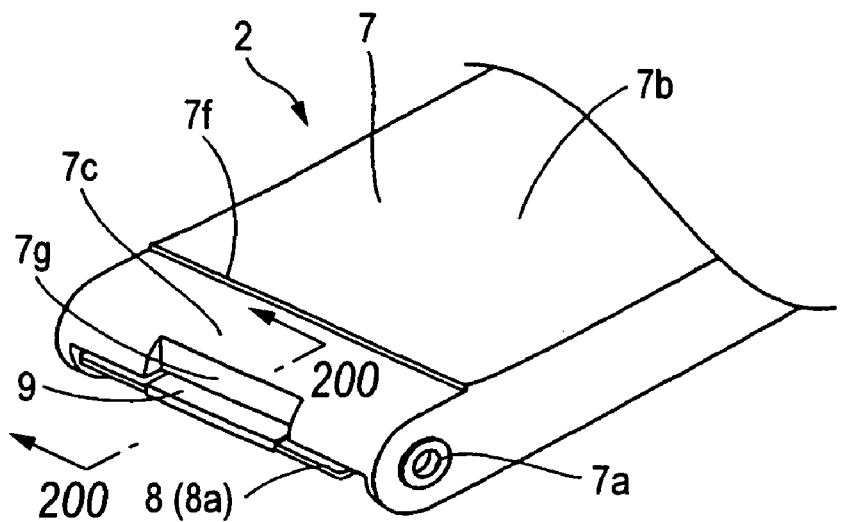
FIG. 6 is a perspective view of the support member of the support structure for liquid crystal television receiver in the mode of embodiment of the present invention shown in FIG. 1.
Figure 8:
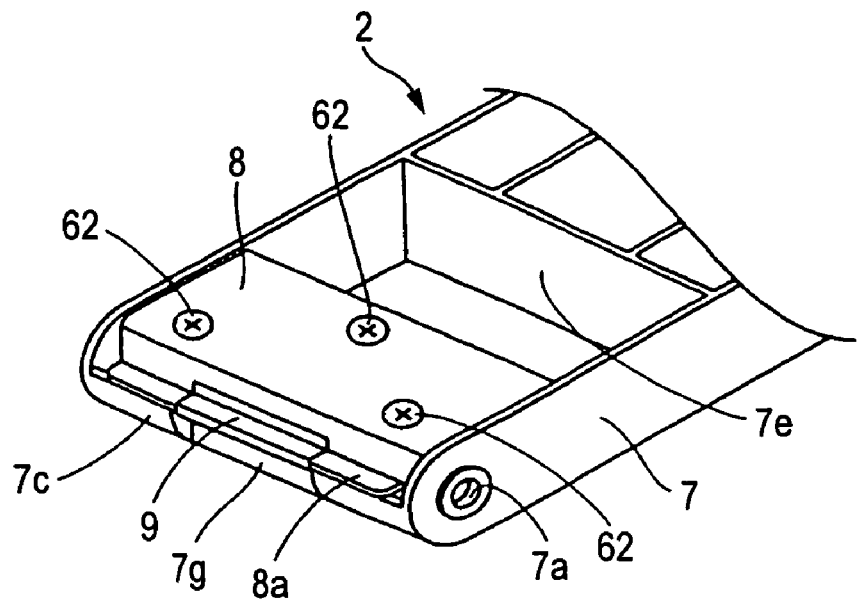
FIG. 8 is a perspective view showing the rear surface of the support member of the support structure for liquid crystal television receiver in the mode of embodiment of the present invention shown in FIG. 1.
Figure 10:
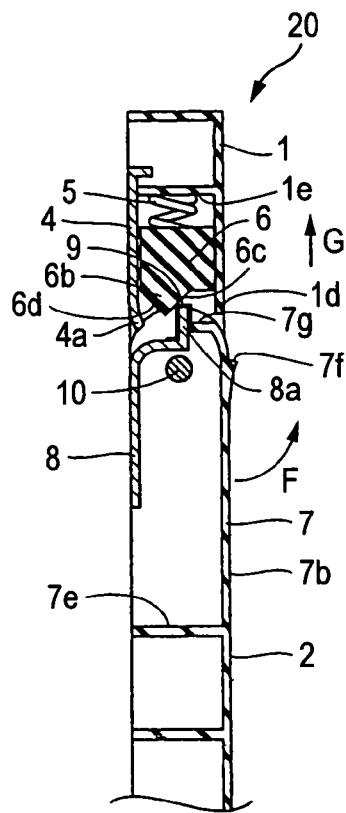
FIG. 10 is a sectional view taken along the line 100-100 in FIG. 1.

The support member 2 has as shown in FIG. 3, FIG. 6 and FIG. 8, a main support 7 made of a resin, and a cover member 8 made of a metal fixed with the screws 62 to the main support 7. This support member 2 is fixed pivotably around a rotary shaft 10 inserted into the rotary shaft fixing hole 7a and a rotary shaft inserting holes 4e (refer to FIG. 9) of the holding member 4 and supported on rotary shaft support portions 1i of the base member 1. The main support 7 also has the above-mentioned rotary shaft fixing hole 7a, an outer surface 7b, a lower surface 7c having a curved surface on the side of the base member 1, an insert hole 7d through which a cord is inserted, and reinforcement ribs 7e for reinforcing the hollow of an inner portion of the main support 7. The outer surface 7b of the main support 7 is provided as shown in FIG. 6 and FIG. 10 with a rib 7f engaging with the engagement portion 1d of the base member 1, and thereby inhibiting the turning of the support member 2 beyond the supporting position.

In this mode of embodiment, the lower end portion 7c of the main support 7 is provided as shown in FIG. 6 and FIG. 8 with a recess 7g with which the cross-sectionally triangular projections 6b (refer to FIG. 4) of the slider 6 mentioned above is engaged. This recess 7g is formed so that the recess 7g is engaged with the inclined surfaces 6c of the projections 6b of the slider 6b.

Figure 7:
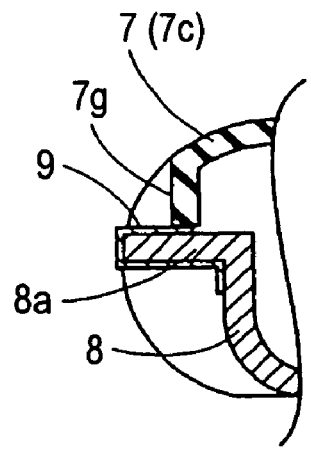
FIG. 7 is a sectional view taken along the line 200-200 in FIG. 6.

In this mode of embodiment, a projection 8a of the metal cover member 8 fixed to the main support 7 is provided as shown in FIG. 7 at the portion thereof which presses the slider 6 with a metal reinforcement member 9. Owing to this structure, it becomes possible owing to the metal reinforcement member 9 to inhibit the support member 2 from being broken even when the portion of the support member 2 which presses the slider 6 is pressed with a force the level of which is not lower than a predetermined level. A projecting portion 8a of the cover member 8 and the reinforcement member 9 are provided so as to extend toward the slider 6 beyond the lower end portion 7c of the main support 7.

Figure 11:
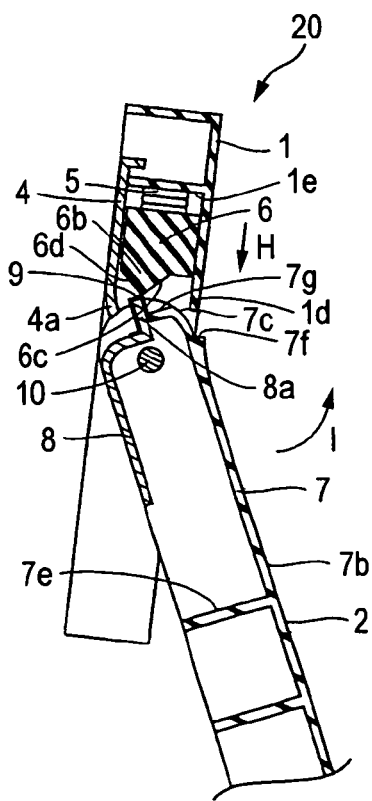
FIG. 11 is a sectional view for describing the opening and closing actions of the support structure for liquid crystal television receiver in the mode of embodiment of the present invention shown in FIG. 1.
Figure 12:
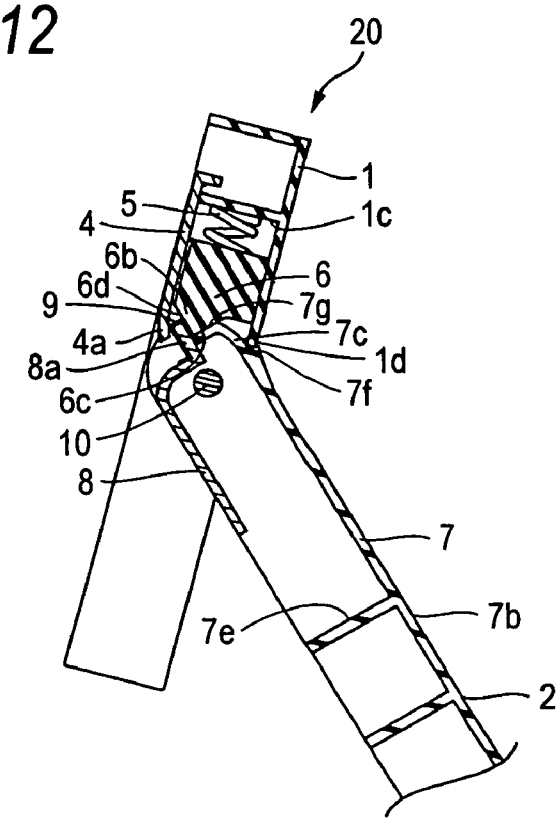
FIG. 12 is a sectional view for describing the opening and closing actions of the support structure for liquid crystal television receiver in the mode of embodiment of the present invention shown in FIG. 1.

FIG. 11 and FIG. 12 are sectional views for describing the opening and closing actions of the support structure for liquid crystal television receiver. Next, the opening and closing actions of the support structure 20 for liquid crystal television receiver will be described with reference to FIG. 10 to FIG. 12. First, the support structure 20 for liquid crystal television receiver shown in FIG. 10 in a closed state with respect to the rear surface 51 (refer to FIG. 2) of the liquid crystal television receiver 50 is turned in the direction of an arrow F in FIG. 10. During this time, the reinforcement member fixed on the projecting portion 8a of the cover member 8 engages with the inclined surface 5c of the slider 6c of the slider 6 and presses the same, so that the slider 6 is moved in the direction of an arrow G in FIG. 9 against the urging force of the compression coiled springs 5. When the support member 2 in this condition is turned, the reinforcement member 9 fixed on the projecting portion 8a of the cover member 8 gets over the inclined surface 6c of the slider 6 as shown in FIG. 11. During this time, the reinforcement member 9 fixed on the projecting portion 8a of the cover member 8 engages the inclined surface 6c of the slider 6 and presses the same, so that the slider 6 is moved in the direction of an arrow G in FIG. 9 against the urging force of the compression springs 5. The support member 2 in this condition is then turned, and the reinforcement member 9 fixed on the projecting portion of the cover member 8 gets over the inclined surface 6c of the slider 6 as shown in FIG. 11. During this time, the reinforcement member 9 fixed on the projecting portion 8a of the cover member 8 is pressed by the inclined surface 6d of the slider 6 in the direction of an arrow H in FIG. 11, so that the support member 2 is turned in the direction of an arrow I in FIG. 11. The reinforcement member 9 fixed on the projecting portion 8a of the cover member 8 engages with the inhibition portion 4a of the holding member 4 fixed to the base member 1 as shown in FIG. 12, and the support member 2 is turned until the projecting portion 7f of the main support 7 engages with the engagement portion 1d of the base member 1. In this condition, the inclined surface 6c of the slider 6 engages with the recess 7g of the main support 7. This enables the liquid crystal television receiver 50 to be supported in the supporting position.

In this mode of embodiment, the cross-sectionally triangular projection 6b having the inclined surface 6c and inclined surface 6d which engage with the reinforcement member 9 fixed on the projecting portion 8a of the cover member 8 while pressing the reinforcement member 9 is provided on the slider 6 as mentioned above. Therefore, when the support member 2 in a closed state is turned toward an opened state, the reinforcement member 9 fixed on the projecting portion 8a of the cover member 8 engages with the inclined surface 6c of the slider 6. Before the reinforcement member gets over the inclined surface 6c, the reinforcement member 9 fixed on the projecting portion 8a of the cover member 8 is pressed by the inclined surface 6c of the slider 6 urged by the compression coiled springs 5 toward the support member 2 even though the support member 2 is turned at a predetermined angle. Therefore, the support member 2 can be returned to the pivotal position in which the support member 2 is closed. When the support member 2 is turned from the closed state toward the opened state, the reinforcement member 9 fixed on the projecting portion 8a of the cover member 8 is pressed by the inclined surface 6d of the slider 6 urged by the compression coiled springs 5 toward the support member 2 after the support member 2 gets over the inclined surface 6c of the slider 6 and reaches the inclined surface 6d. Therefore, the support member 2 can be automatically set in the pivotal position (supporting position) in which the support member 2 is in an opened state by the pressing force of the inclined surface 6d. Owing to this structure, it becomes possible to inhibit the support member 2 from being retained in an intermediate position other than the position in which the support member 2 is in a closed state or in the position in which the support member 2 is in a closed state. As a result, the liquid crystal television receiver 50 can be supported stably in the supporting position.

In this mode of embodiment, the compression coiled springs 5 of a large urging force urging the slider 6 toward the support member 2 are provided in an inner portion of the base member 1, so that the support member 2 can be pressed with a pressing force the level of which is higher than that of the elastic metal member, such as a leaf spring used for the same purpose. Owing to this structure, the turning of the support member 2 in an opened state can be inhibited more effectively than in a case where the support member 2 is pressed by a metal member having an elasticity, such as a leaf spring, even though a large force the level of which is not lower than a predetermined level for turning the support member 2 in the direction in which the support member 2 is closed is imparted to the same in the supporting position in which the support member 2 is opened.

In this mode of embodiment, the holding member 4 including the restriction portion 4a for inhibiting the turning of the support member 2 beyond the supporting position is fixed to the base member 1. Therefore, even when the support member 2 is nearly turned beyond the supporting position, the inhibition portion 4a of the holding member 4 can inhibit the support member 2 from being turned beyond the supporting position.

Figure 13:
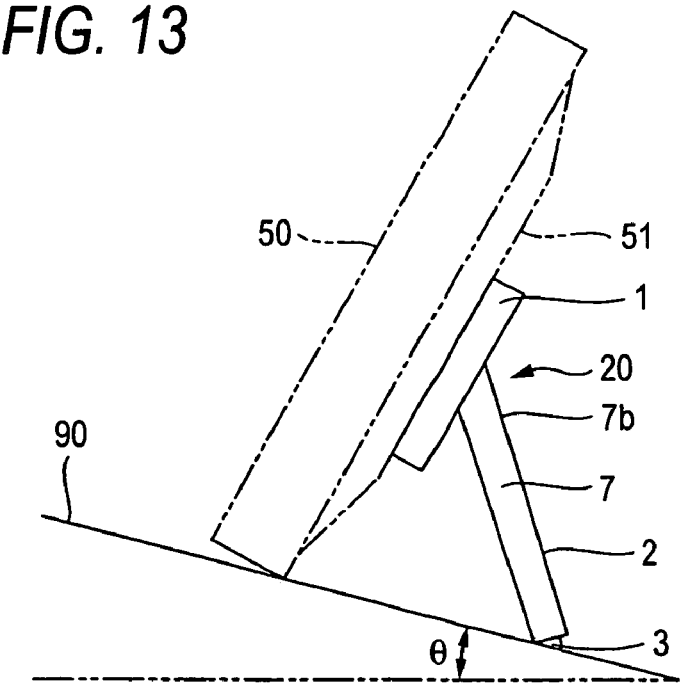
FIG. 13 is a side view showing the condition of a liquid crystal television receiver to which the support structure for liquid crystal television receiver in the mode of embodiment according to the present invention shown in FIG. 1 is fixed is placed on an inclined surface.
Figure 14:
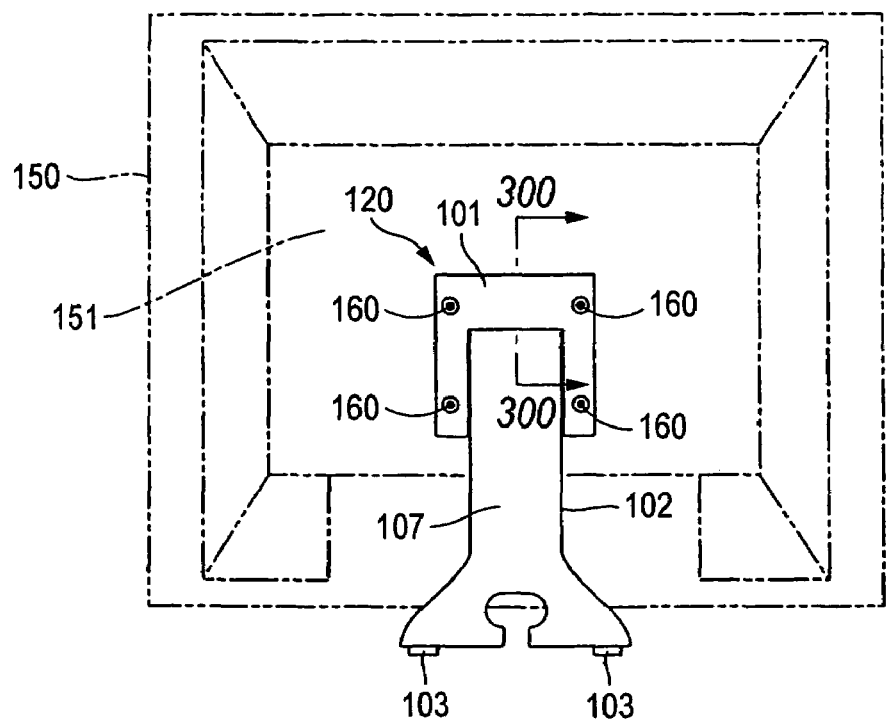
FIG. 14 is a plan view showing the condition of an example of a related art support structure for liquid crystal television receiver, which is fixed to a rear surface of the liquid crystal television receiver.
Figure 15:
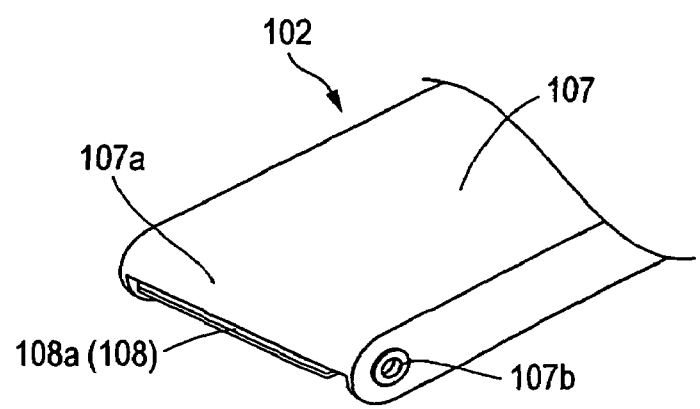
FIG. 15 is a perspective view showing the support member of the related art support structure for liquid crystal television receiver shown in FIG. 14.

In this mode of embodiment, the recess 7g engaging with the inclined surface 6c of the slider 6 when the support member 2 is in an opened state is provided in the support member 2, so that the inclined surface 6c of the slider 6 urged by the compression coiled springs 5 toward the support member 2 can be engaged with the recess 7g of the support member 2. Therefore, the support member 2 can be kept stable in an opened state (supporting position). This enables the support member 2 to be put in an opened state as shown in FIG. 13, and the liquid crystal television receiver 50 to be supported stably. Even when the liquid crystal television receiver 50 in an inclined state is set on an inclined surface 90 having an angle θ of inclination (about 15°), the liquid crystal television receiver 50 can be supported stably.

It should be considered that the mode of embodiment disclosed this time is an exemplification in all respects and not limitative. The scope of the present invention does not reside in the description given above of the mode of embodiment but is shown in the claims thereof. Moreover, the present invention includes the meanings identical with those of the claims and all modifications made within the scope thereof.

For example, in the above mode of embodiment, an example in which the present invention is applied to liquid crystal television receiver as an example of a support structure for a display device but the present invention is not limited to this. The present invention may be applied to a support structure for other display device, such as a plasma display device as long as the display device is provided with a support structure.

In the above-described mode of embodiment, an example in which boss portions are provided in the base member with a groove provided in the slider is shown. The present invention is not limited to such an example. The boss portions and groove may not be provided.

In the above-described mode of embodiment, an example in which the reinforcement member is fixed on the projecting portion of the cover member but the present invention is not limited to this example. The reinforcement member may not be fixed on the projecting portion. In this embodiment, the cover member engaging with the slider is preferably made of a metal.

What is claimed is:

1. A support structure for liquid crystal television receiver, comprising:
    a base member fixed to a rear surface of the liquid crystal television receiver;
    a support member which is fixed pivotably to the base member and supports the liquid crystal television receiver in a supporting position in an opened state in which the liquid crystal television receiver is inclined at a predetermined angle with respect to the base member, and capable of being stored in the base member in a closed state in which the support member is closed with respect to the base member;
    a holding member which is fixed to the base member and includes a regulation portion that regulates rotation of the support member beyond the supporting position;
    a pressure member that presses an end portion of the support member; and
    a compression coiled spring which urges the pressure member toward the support member, wherein
    the base member includes a boss portion,
    the pressure member includes:
    a protruded portion having a cross section of an end-sharpened triangle, and first and second inclined surfaces which contact with the support member while pressing the end portion of the support member when the support member rotates from the closed state to the opened state; and
    a groove which is opposed to the boss portion of the base member,
    the support member includes:
    a recess engaging the first inclined surface of the pressure member when the support member is in the opened state; and
    a metal reinforcement member which is fixed at the end portion pressed by the pressure member of the support member.

2. A support structure for a display device, comprising:
    a base member fixed to a rear surface of the display device;
    a support member which is fixed pivotably to the base 15 member and supports the display device in a supporting position in an opened state in which the display device is inclined at a predetermined angle with respect to the base member, and capable of being stored in the base member in a closed state in which the support member is closed with respect to the base member;

a holding member that is fixed to the base member and includes a regulation portion that regulates rotation of the support member beyond the supporting position;

a pressure member that presses an end portion of the support member; and a compression coiled spring that urges the pressure member toward the support member, wherein the pressure member includes:

a protruded portion having a cross section of an end-sharpened triangle, and first and second inclined surfaces which contact with the support member while pressing the end portion of the support member when the support member rotates from the closed state to the opened state.

3. The support structure for a display device according to claim 2, wherein the support member includes:

a recess engaging the first inclined surface of the pressure member when the support member is in the opened state.

4. The support structure for a display device according to claim 2, wherein the base member includes a boss portion, the pressure member includes a groove which is opposed to the boss portion of the base member.

5. The support structure for a display device according to claim 2, wherein a metal reinforcement member is fixed at the end portion which is pressed by the pressure member of the support member.

* * * * *